(12) United States Patent
Sakazaki et al.

(10) Patent No.: US 7,661,717 B2
(45) Date of Patent: Feb. 16, 2010

(54) HOSE CLAMP HOLDING STRUCTURE

(75) Inventors: Kazushige Sakazaki, Aichi-ken (JP); Kentaro Sugita, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 2 days.

(21) Appl. No.: 11/965,175

(22) Filed: Dec. 27, 2007

(65) Prior Publication Data

US 2008/0209691 A1 Sep. 4, 2008

(30) Foreign Application Priority Data

Feb. 20, 2007 (JP) .............................. 2007-040096

(51) Int. Cl.
*F16L 35/00* (2006.01)
(52) U.S. Cl. ........................................ 285/24; 24/20 R
(58) Field of Classification Search ................ 24/20 R; 285/24, 238, 148.17, 23
See application file for complete search history.

(56) References Cited

U.S. PATENT DOCUMENTS

2006/0186668 A1* 8/2006 Sakazaki et al. ............ 285/420

2006/0277724 A1 12/2006 Sakazaki

FOREIGN PATENT DOCUMENTS

| JP | 4-194486 | 7/1992 |
| JP | 2003-314759 | 11/2003 |

* cited by examiner

*Primary Examiner*—Aaron M Dunwoody
(74) *Attorney, Agent, or Firm*—Andrus, Sceales, Starke & Sawall, LLP

(57) ABSTRACT

An annular positioning projection integrally has a body portion extending in a circular arc, one end portion projecting from one circumferential end of the body portion toward one raised portion and connected to a radial outer surface of the one raised portion, and the other end portion projecting from the other circumferential end of the body portion toward the other raised portion and connected to a radial outer surface of the other raised portion. An outer surface of one end portion thereof extends in a tangential direction with respect to one circumferential end of an outer surface of the body portion, and an outer surface of the other end portion extends in a tangential direction with respect to the other circumferential end of an outer surface of the body portion.

4 Claims, 7 Drawing Sheets

HOSE CLAMP HOLDING STRUCTURE

BACKGROUND OF THE INVENTION

1. Field of the Invention

The present invention relates to a hose clamp holding structure for positioning and holding a hose clamp on an outer periphery of an end portion of a hose. The hose clamp is used, for example, for connection of a fuel hose and a pipe in a motor vehicle.

2. Description of the Related Art

In a fuel piping of a motor vehicle, for example, for fluid communication between pipes, used is a rubber or elastomer fuel hose including a gasoline fuel impermeable layer. A gasoline fuel path is constructed between the pipes by fitting each end portion of the fuel hose to an outer periphery of each of the pipes.

In order to prevent leakage of gasoline fuel at a joint between the fuel hose and the pipe, a seal ring is disposed in an inner periphery of the fuel hose for providing a seal therebetween. And, in order to prevent dislodgment of the fuel hose from the pipe, the fuel hose is tightly fitted to the outer periphery of the pipe. Unlike a resin tube, however, sufficient securing strength with respect to the pipe cannot be expected for the rubber or elastomer fuel hose by itself. So, in a connecting structure typically employed, a hose clamp is fitted on an outer periphery of an end portion of the fuel hose, and the fuel hose is tightened and secured to the pipe by the hose clamp (for example, refer to Patent Document 1).

A hose clamp for firmly securing the fuel hose to the pipe comprises an annular clamp body, and an operating portion for diametrically contracting and expanding the clamp body. The operating portion is, for example, in a form of an operation screw. When this hose clamp is used, the clamp body in diametrically expanded state is preliminarily fitted on a clamp mounting portion of an end portion of the hose while being positioned in a longitudinal direction of the hose, and then, the fuel hose with the hose clamp is fitted to the pipe. After that, the clamp body is diametrically contracted, for example, by rotating the operation screw with an electric driver or air driver, to tighten the fuel hose to the pipe. In this manner, connecting work may be carried out relatively easily.

Meanwhile, for example, in the hose clamp with an operation screw, it is necessary to turn the hose clamp on the outer periphery of the end portion of the hose so as to locate the operation screw in a predetermined circumferential position when the operation screw is rotated, and to hold the hose clamp non-rotationally or non-turnably while the clamp body is diametrically contracted by rotating the operation screw. Thus, basically, connecting work requires both hands. However, in many cases, connecting work of the fuel hose and the pipe is done in a narrow engine compartment where parts are closely arranged and an operator has difficulty to do connecting work by using his/her both hands freely. So, it bothers considerably the operator to tighten the hose clamp.

A technique for eliminating such inconvenience is disclosed. For example, Patent Document 2 discloses a hose clamp holding structure where an anti-rotation engaging portion protruding in a longitudinal direction of a hose is formed on a clamp body of a hose clamp, an engaging recessed portion is formed in an outer periphery of an end portion of the hose for receiving the anti-rotation engaging portion, and thereby the hose clamp can be positioned circumferentially with respect to the hose.

[Patent Document 1] JP-A-2003-314759
[Patent Document 2] JP-A-4-194486

By the way, for ensuring anti-rotation function with respect to the anti-rotation engaging portion of the clamp body, it is effective to provide a pair of raised portions on an outer periphery of the end portion of the hose in circumferentially spaced relation to define an engaging recessed portion between the pair of the raised portions. And, the pair of the raised portions may be formed on an outer end or an outer end portion of the end portion of the hose to fit the hose clamp on a portion of the hose longitudinally inward from the pair of the raised portions. In this arrangement, the raised portions prevent the hose clamp from falling off or slipping off from the end portion of the hose. And, for preventing the hose clamp from escaping via other region of the hose than the raised portions it is favorable that, an annular positioning projection is formed on outer periphery of the outer end portion of the end portion of the hose. The annular positioning projection could be designed in low height in order to increase a space around the outer periphery of the end portion of the hose as much as possible. However, in this case, there is a concern that the hose clamp obliquely passes through the end portion of the hose, from a diametrically opposite side of the raised portions toward the raised portions, then, completely passes through the raised portions and falls off entirely of the end portion of the hose.

Under the circumstances described above, it is an object of the present invention to provide a hose clamp holding structure for holding a hose clamp consistently on an end portion of a hose.

SUMMARY OF THE INVENTION

In order to achieve a foregoing object, according to the present invention, there is provided a novel hose clamp holding structure. The hose clamp holding structure comprises a pair of raised portions spaced apart circumferentially on an outer periphery of an outer end portion of an end portion of the hose, an annular positioning projection on the outer periphery of the outer end portion of the end portion of the hose, a large diameter portion of an outer periphery of the end portion of the hose, axially inward with respect to the annular positioning projection, and a hose clamp having an annular clamp body and an anti-rotation engaging portion on the annular clamp body. The annular positioning projection extends from an outer surface of one of the raised portions (namely one raised portion) to an outer surface of the other of the raised portions (namely the other raised portion). The hose clamp is attached on the outer periphery of the end portion of the hose by fitting the clamp body on an annular clamp mounting portion between the annular positioning projection and the large diameter portion with the anti-rotation engaging portion received in a recessed engaging portion between the pair of the raised portions non-rotationally. The annular positioning projection has a body portion extending in a circular arc from a base end portion of the outer surface of said one raised portion to a base end portion of the outer surface of the other raised portion. One end portion is formed or provided integrally on one circumferential end of the body portion, and said one end portion is connected to the outer surface of said one raised portion. And, the other end portion is formed or provided on the other circumferential end of the body portion, and the other end portion is connected to the outer surface of the other raised portion. An outer surface of said one end portion of the annular positioning projection extends in a tangential direction or generally in a tangential direction with respect to one circumferential end of an outer surface or an outer peripheral surface of the body portion, and an outer surface of the other end portion of the annular positioning projection extends in a tangential direction or generally in a tangential direction with respect to the other circumferential end of the outer surface or the outer peripheral surface of the body portion.

The large diameter portion is in a form of, for example, an annular projection, or a portion forming an annular stepped portion toward radially outward. The base end portion of the outer surface of said one raised portion means a region of the outer surface (radially outer surface) of said one raised portion that starts rising from the outer peripheral surface of the end portion of the hose, namely, a starting end of the outer surface of said one raised portion, and the base end portion of the outer surface of the other raised portion means a region of the outer surface (radially outer surface) of the other raised portion that starts rising from the outer peripheral surface of the end portion of the hose, namely, a starting end of the outer peripheral surface of the other raised portion. The outer surface of said one end portion of the annular positioning projection extends in the tangential direction or generally in the tangential direction with respect to said one circumferential end of the outer peripheral surface of the body portion, and is connected to the outer surface of said one raised portion, while the outer surface of the other end portion of the annular positioning projection extends in the tangential direction or generally in the tangential direction with respect to the other circumferential end of the outer peripheral surface of the body portion, and is connected to the outer surface of the other raised portion. When the annular positioning projection is in a form of a simple circular shape or circular arc shape, a dent is defined generally at a position of each of the base end portions of the outer surfaces of the raised portions. However, in the annular positioning projection of the present invention, such dents are closed by or filled in with one and the other end portions of the annular positioning projection, namely no dent is defined generally at a position of each of the base end portions of the outer surfaces of the raised portions. Therefore, when the hose clamp tends to obliquely pass through the end portion of the hose, from the diametrically opposite side of the raised portions toward the raised portions, the hose clamp contacts one and the other end portions of the annular positioning projection, and is blocked by said one and the other end portions of the annular positioning projection from being displaced over the raised portions, and is not allowed to dislodge out of the end portion of the hose.

With the hose clamp holding structure according to the present invention, even in a piping layout where an end portion of a hose with a hose clamp is oriented downward, the hose clamp can stay or remain on the end portion of the hose without fail until the hose clamp is fully tightened.

Now, the preferred embodiments of the present invention will be described in detail with reference to the drawings.

DETAILED DESCRIPTION OF THE PREFERRED EMBODIMENTS

Figure 1:
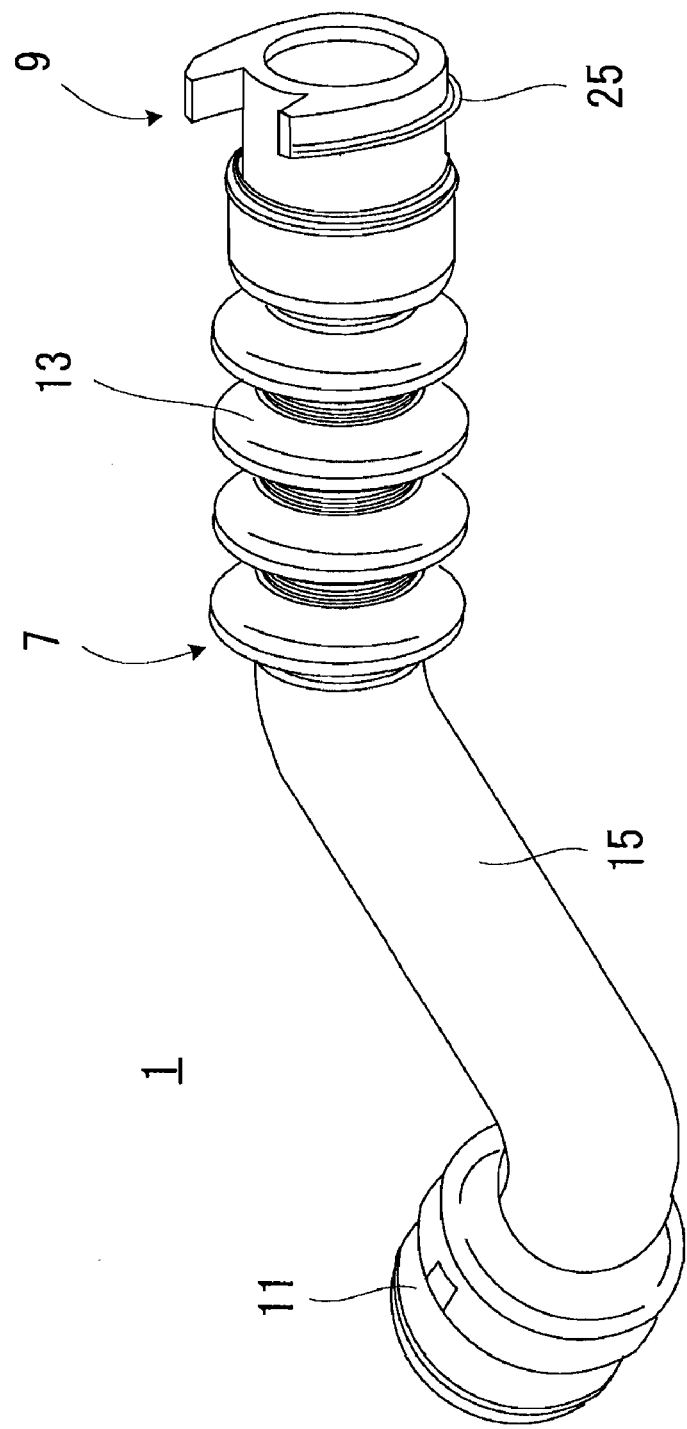
FIG. 1 is a perspective view of a corrugated rubber hose having a hose clamp holding structure according to the present invention.

A corrugated rubber hose 1 as shown in FIG. 1 is adapted for fuel piping around a fuel tank in a motor vehicle. The corrugated rubber hose 1 has a hose body 7, a clamp portion (fit-on portion) 9 that is formed integrally with one end portion of the hose body 7, and a jointing portion 11 that is formed integrally with the other end of the hose body 7. The hose body 7 has a rubber layer 3 of which an inner surface is coated with a gasoline fuel impermeable resin membrane 5. The hose body 7 is formed by integrally joining a corrugated portion 13 and straight-walled portion (an extending portion of a uniform or identical diameter) 15. A hose clamp 17 is mounted on the fit-on portion 9 of thus constructed corrugated rubber hose 1, and thereby a clamp equipped corrugated rubber hose 19 is obtained (refer to FIG. 5).

Figure 3:
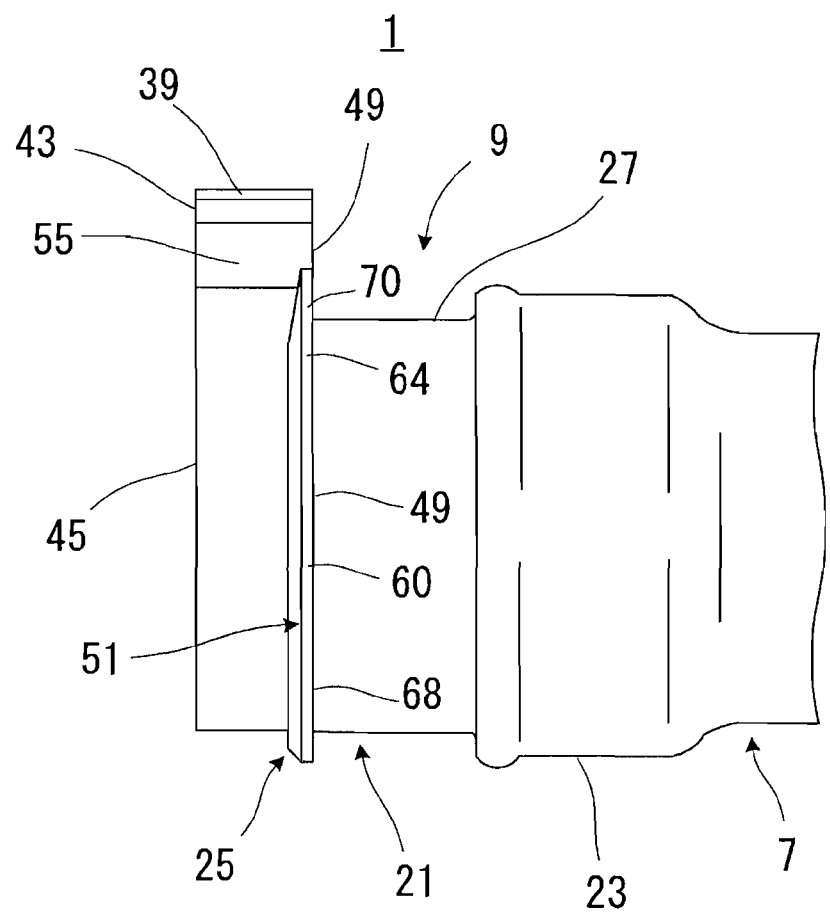
FIG. 3 is a front view of the clamp portion of the corrugated rubber hose.
Figure 4:
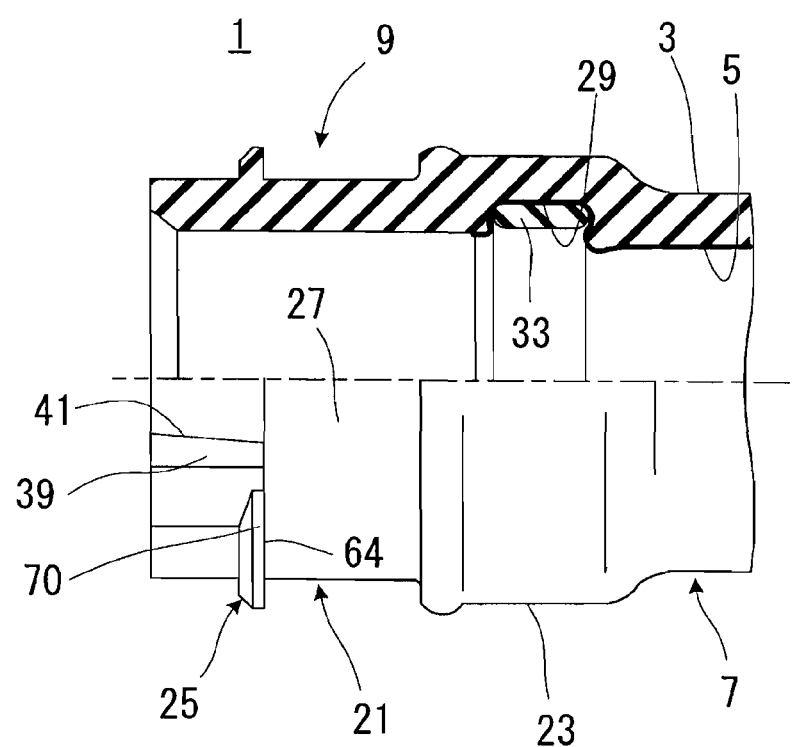
FIG. 4 is a plane view of the clamp portion of the corrugated rubber hose.

As well shown in FIG. 3, the fit-on portion 9 of the corrugated rubber hose 1 has a tubular portion (cylindrical portion) 21 lying longitudinally outward of the fit-on portion 9 and having a uniform outer diameter along its entire length, and a large diameter portion 23 lying longitudinally inward of the fit-on portion 9. The tubular portion 21 is provided integrally with an annular positioning projection (ring-shaped projection) 25 on a longitudinally outer end of its outer periphery. The large diameter portion 23 of the fit-on portion 9 has an outer diameter identical or generally identical to that of the annular positioning projection 25 on its longitudinally outer end portion. An annular clamp mounting portion 27 is defined between the large diameter portion 23 and the annular positioning projection 25, and has a bottom portion that is a longitudinally inward region of an outer peripheral surface of the tubular portion 21. In the large diameter portion 23, an outer diameter of a longitudinally middle portion is designed slightly smaller than that of a longitudinally outer end portion, and an outer peripheral surface of the longitudinally inner end portion is tapered and decreasing diameter toward an outer peripheral surface of the hose body 7. An inner periphery of the large diameter portion 23 is formed with an annular groove 29 in which a rubber seal ring 33 of a rectangular or elongated circular cross-section is fitted for providing a seal with respect to a pipe 31 (refer to FIG. 6). Meantime, an outer end portion of the resin membrane 5 extends outward slightly beyond the annular groove 29 so as to provide a coating entirely over the annular groove 29.

The tubular portion 21 is formed with a recessed engaging portion (engagement holding portion) 35 at a predetermined circumferential position on an outer periphery of the longitudinally outer end portion thereof. The recessed engaging portion 35 is defined between a pair of raised portions 37, 39 that are formed circumferentially spaced apart integrally on an outer peripheral surface of the longitudinally outer end portion of the tubular portion 21, and includes a bottom portion that is the outer peripheral surface of the tubular portion 21. Each of inner surfaces (radially or circumferentially inner surfaces) of the raised portions 37, 39 defines an anti-rotation (rotation preventing) side portion or side wall. And, the inner surface of the raised portion 37 on one circumferential end (the raised portion 37 on the left in FIG. 2) extends along a longitudinal direction of the corrugated rubber hose 1, while an inner surface 41 of the raised portion 39 on the other circumferential end (the raised portion 39 on the right in FIG. 2) is angled at an angle of about 3° to 5° so as to open longitudinally inward of the corrugated rubber hose 1.

Figure 2:
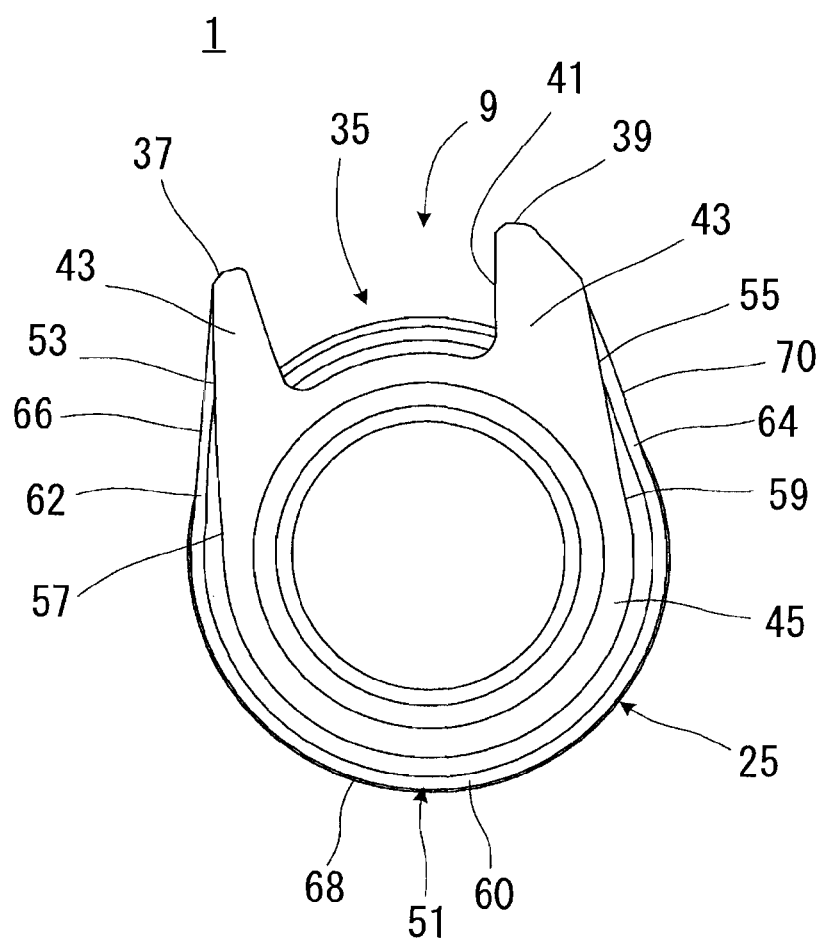
FIG. 2 is a side view of a clamp portion of the corrugated rubber hose.
Figure 5:
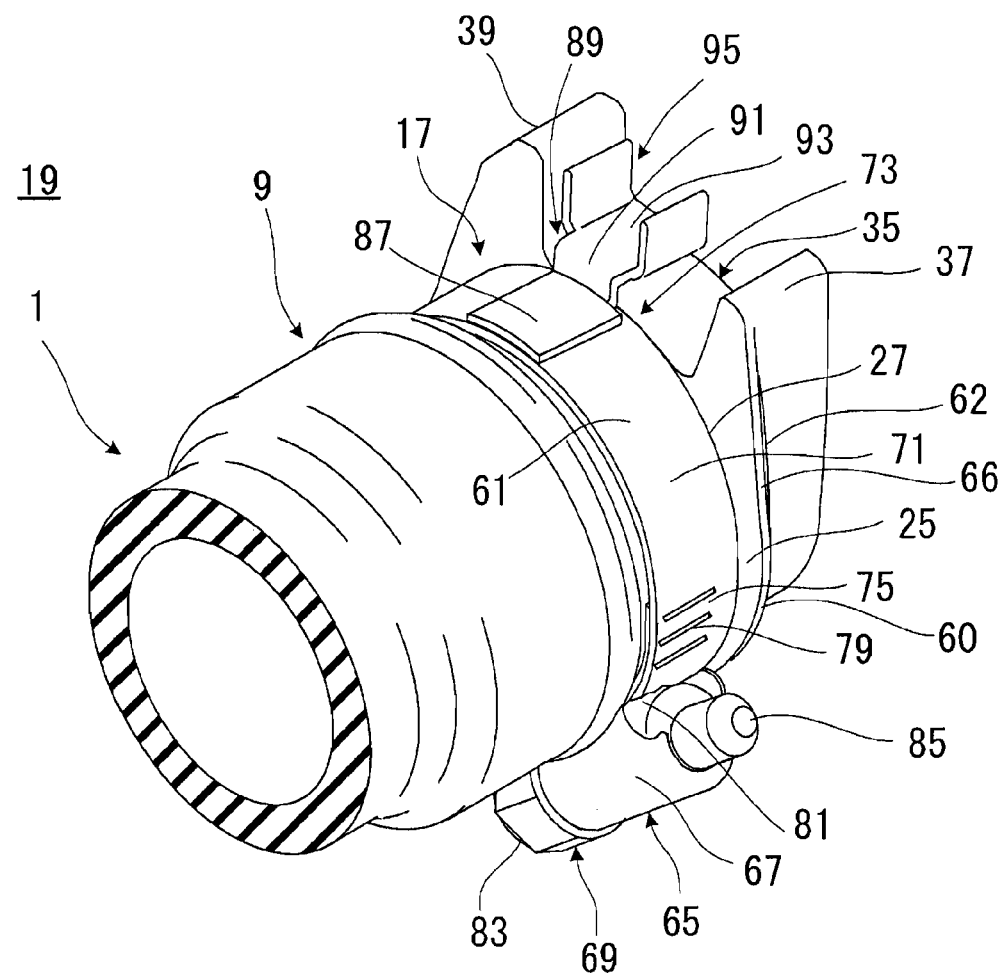
FIG. 5 is a perspective view showing a state of the corrugated rubber hose equipped with a hose clamp before the hose clamp is tightened.

As understood from FIGS. 2, 3 and 5, longitudinally outer surfaces 43 of the pair of the raised portions 37, 39 are flush with a longitudinally outer end surface 45 of the tubular portion 21, and longitudinally inner surfaces 47 of the pair of the raised portions 37, 39 are flush with a longitudinally inner surface 49 of the annular positioning projection 25. Circumferentially opposite end portions of the annular positioning projection 25 or circumferentially opposite end portions of an outer peripheral surface 51 of the annular positioning projection 25 are connected to radially or circumferentially outer surfaces 53, 55 of the pair of the raised portions 37, 39, respectively. So, the annular positioning projection 25 is not formed between the pair of the raised portions 37, 39. The radially outer surface 53 of the raised portion 37 projects or extends linearly (straight) at an angle slightly radially outward from a tangential direction with respect to the outer peripheral surface of the tubular portion 21 at a base end portion 57 of the radially outer surface 53 (connecting position between the radially outer surface 53 and the outer peripheral surface of the tubular portion 21), and the radially outer surface 55 of the raised portion 39 projects or extends linearly (straight) at an angle slightly radially outward from a tangential direction with respect to the outer peripheral surface of the tubular portion 21 at a base end portion 59 of the radially outer surface 55 (connecting position between the radially outer surface 55 and the outer peripheral surface of the tubular portion 21) and then projects angularly radially inward. The raised portion 39 entirely has a radial thickness larger than the raised portion 37. A circumferential distance on a side of the recessed engaging portion 35 between the base end portion 57 of the radially outer surface 53 of the raised portion 37 and the base end portion 59 of the radially outward surface 55 of the raised portion 39 has or corresponds to a center angle smaller than 180 degrees, of about 150 degrees.

A distance (distance in a straight line) between the base end portion 57 of the radially outer surface 53 of the raised portion 37 and the base end portion 59 of the radially outer surface 55 of the raised portion 39 is slightly smaller than the outer diameter of the tubular portion 21. Also, a distance between the radially outer surface 53 and the radially outer surface 55 (a portion extending straight) along a direction parallel to a direction connecting between the base end portions 57, 59 is entirely smaller than the outer diameter of the tubular portion 21, and is gradually decreased toward a projecting direction.

The annular positioning projection 25 integrally has a body portion 60, one end portion 62 and the other end portion 64. The body portion 60 has a circular or circular arc shape, and extends from a circumferential position of the base end portion 57 of the radial outer surface 53 to a circumferential position of the base end portion 59 of the radial outer surface 55, on a side opposite to the recessed engaging portion 35. One end portion 62 projects from one circumferential end of the body portion 60 toward the raised portion 37 and is connected to the radial outer surface 53 of the raised portion 37, and the other end portion 64 projects from the other circumferential end of the body portion 60 toward the raised portion 39 and is connected to the radial outer surface 55 of the raised portion 39. The one end portion 62 extends on the radial outer surface 53 along the radial outer surface 53, and the other end portion 64 extends on the radial outer surface 55 along the radial outer surface 55. An outer surface 66 of the one end portion 62 extends in a tangential direction or generally in a tangential direction with respect to one circumferential end of an outer peripheral surface 68 of the body portion 60, and is connected to an outer end portion of the radial outer surface 53 of the raised portion 37. And, an outer surface 70 of the other end portion 64 extends in a tangential direction or generally in a tangential direction with respect to the other circumferential end of the outer peripheral surface 68 of the body portion 60, and is connected to an outer end portion of the radial outer surface 55 of the raised portion 39 (a portion extending straight).

In the annular clamp mounting portion 27 of the corrugated rubber hose 1, the hose clamp 17 is mounted or fitted while being positioned in a longitudinal direction of the corrugated rubber hose 1. The hose clamp 17 has a flexible clamp band (clamp body) 61 that is made of a metal such as stainless steel and has one circumferential end portion 77 and the other circumferential end portion 63. The hose clamp 17 further has a band-carrier clamp (clamp housing) 65 provided on the other circumferential end portion 63 of the clamp band 61, an operation screw 69 received in a screw receiving portion 67 of the band-carrier clamp 65, and anti-rotation engaging portion 73 provided integrally on the clamp band 61, on one circumferential side (a side toward one circumferential end) with respect to the diametrically opposite end of the operation screw 69, or one circumferential end region 71. The operation screw 69 is received in the screw receiving portion 67 of the band-carrier clamp 65 so as to turn free and extend in a tangential direction with respect to the clamp band 61. The clamp band 61 includes a number of engaging slits 79 extending in a widthwise direction thereof on one circumferential end part 75 or one circumferential end portion 77. The engaging slits 79 are arranged serially in a longitudinal direction of the clamp band 61 or in a circumferential direction of the corrugated rubber hose 1. One circumferential end part 75 of the clamp band 61 is passed through the band-carrier clamp 65 such that the engaging slits 79 engage with a male threaded portion 81 of the operation screw 69 (the engaging slits 79 are often slightly angled in a widthwise direction in order to ensure engagement or thread engagement with the male threaded portion 81). For example, an electric driver or air driver is engaged in a driver slit in a head 83 of the operation screw 69, and the operation screw 69 is rotated by the electric driver to adjust a length of one circumferential end part 75 of the clamp band 61 relatively passing through the band-carrier clamp 65, thereby to adjust a diameter of the clamp band 61. The band-carrier clamp 65 may be regarded, for example, as a part of the clamp band 61. The operation screw 69 is disposed with the head 83 toward one circumferential end of the clamp band 61 (the lower in FIG. 7) and with its point 85 toward the other circumferential end thereof (the upper in FIG. 7). That is, the operation screw 69 is arranged in such manner that, in the clamp band 61 in its flattened state (in its unrolled state), the head 83 is located closer to the longitudinal center of the clamp band 61 than the point 85. Here, the operation screw 69 is arranged in such manner that a position of the point 85 generally corresponds to a position of the other circumferential end (the other circumferential extremity) of the clamp band 61.

The anti-rotation engaging portion 73 is in a form of a plate or a thin-walled plate □ provided on a circumferentially middle portion, more specifically, on one circumferential end region 71 of the clamp band 61. The anti-rotation engaging portion 73 has a square or rectangular base portion 87 secured to an outer surface of the clamp band 61, and an engaging body 89 formed integrally on and bent out from an outer end of the base portion 87. The engaging body 89 includes a rise portion 91 rising or bent out radially outward from the outer end of the base portion 87, and a longitudinal portion 93 extending in a longitudinal direction of the corrugated rubber hose 1 from an outer end of the rise portion 91. The entire longitudinal portion 93 except for a small part near a connecting base end defines a rotation stopper portion 95. Circumferentially opposite end portions or opposite ends of the rotation stopper portion 95 are bent outward, and thereby the rotation stopper portion 95 is formed in a three-quarter box shape. The rotation stopper portion 95 is located longitudinally outward with respect to the clamp band 61.

The clamp band 61 is provided with a stopper 99 for preventing the clamp band 61 from being diametrically overcontracted, on the other circumferential end part 97. A semicircular line cut 101 is made in the clamp band 61, and a portion inside the cut 101 is bent outward to form the stopper 99. The stopper 99 abuts one circumferential end (one circumferential extremity) 103 of the clamp band 61 (refer to FIG. 7B) and blocks the clamp band 61 from being further diametrically contracted.

The hose clamp 17 is mounted on the fit-on portion 9 of the corrugated rubber hose 1 by being held by the hose clamp holding structure in such manner that the clamp band 61 in a diametrically expanded state enters or seats in the annular clamp mounting portion 27, with the rotation stopper portion 95 of the anti-rotation engaging portion 73 received in the engaging recessed portion 35. Since a width of the annular clamp mounting portion 27 is slightly larger than a width of the clamp band 61, the clamp band 61 seats in the annular clamp mounting portion 27 with a clearance in the longitudinal direction of the corrugated rubber hose 1. And, since a width of the rotation stopper portion 95 of the anti-rotation engaging portion 73 is one half or about one half of a width, a distance or a circumferential distance of the engaging recessed portion 35 (a width of the narrowest region thereof), the rotation stopper portion 95 is received in the engaging recessed portion 35 movably in a circumferential direction.

Figure 7A:
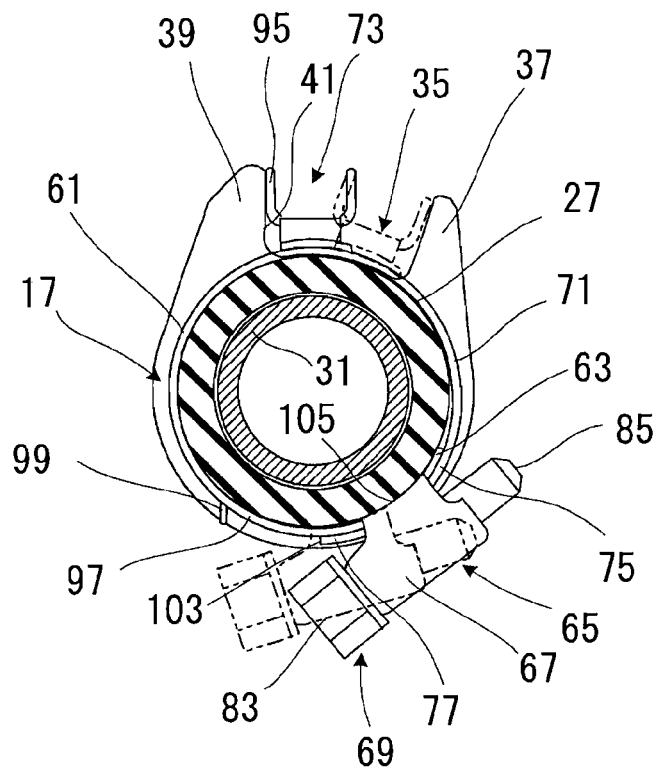
FIGS. 7A and 7B are views for explaining a motion of an anti-rotation engaging portion during contracting the hose clamp diametrically.
Figure 7B:
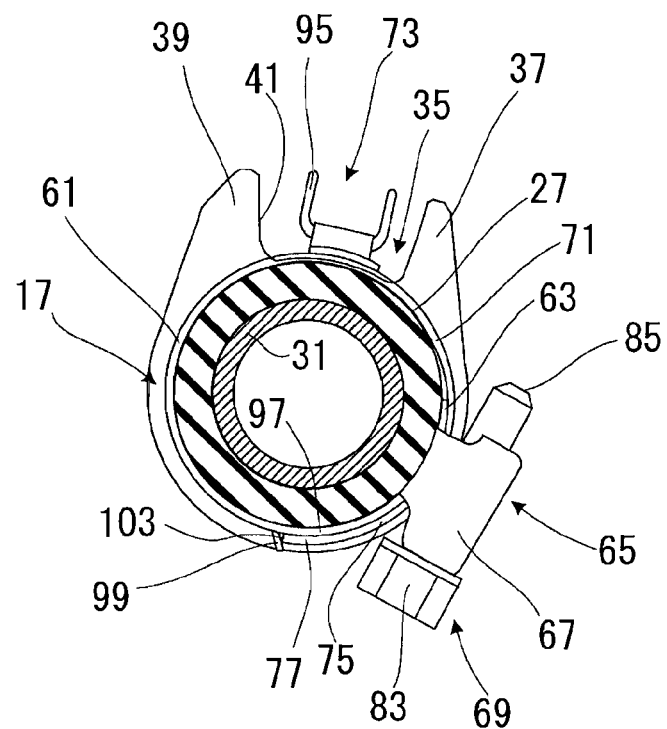

The hose clamp 17 is mounted or fitted on the fit-on portion 9 of the corrugated rubber hose 1 while the clamp band 61 is located in the annular clamp mounting portion 27 and the rotation stopper portion 95 enters in the engaging recessed portion 35. Thus, the hose clamp 17 is not allowed to be displaced in the longitudinal direction or the circumferential direction of the corrugated rubber hose 1 beyond acceptable range until the corrugated rubber hose 1 is fitted to a pipe 31 (refer to FIG. 5). Here, first, the corrugated rubber hose 1 is fitted to the pipe 31, and an electric driver or air driver is pressed onto the head 83 of the operation screw 69 of the hose clamp 17. That way, the hose clamp 17 turns around the annular clamp mounting portion 27, for example, until the rotation stopper portion 95 abuts an inner surface 41 of the raised portion 39 of the other circumferential end (although FIG. 7A shows that the hose clamp 17 is initially located as indicated in phantom line and then pushed by the electric driver to turn as indicated in solid line, the hose clamp 17 is not always initially located as indicated in the phantom line). And, upon diametrically contracting the clamp band 61 by rotating the operation screw 69, for example, an inner diameter of the clamp band 61 becomes equal to an outer diameter of the clamp mounting portion 27, and the clamp band 61 starts tightening the clamp mounting portion 27 (refer to FIG. 7A). Then, the rotation stopper portion 95 is displaced and moved in one circumferential direction, while the operation screw 69 is displaced and moved in the other circumferential direction (refer to FIG. 7B: As long as the clamp band 61 has an inner diameter larger than an outer diameter of the clamp mounting portion 27, even when the operation screw 69 is rotated, the rotation stopper portion 95 remains in being pressed against the inner surface 41 of the raised portion 39 of the other circumferential end). The operation screw 69 is rotated until one circumferential end 103 of the clamp band 61 abuts the stopper 99 and the clamp band 61 is no longer allowed to be diametrically contracted. Here, a circumferential distance (A) between one circumferential end 103 of the clamp band 61 and the stopper 99 at start of tightening of the clamp mounting portion 27 by the clamp band 61 (namely, at the time when the inner diameter of the clamp band 61 becomes equal to the outer diameter of the clamp mounting portion 27 as shown in FIG. 7A) is equal to or generally equal to a sum of a traveling distance (B) of the rotation stopper portion 95 in one circumferential direction relative to the clamp mounting portion 27 during the time from start to end of tightening of the clamp mounting portion 27 by the clamp band 61 and a traveling distance (C) of the operation screw 69 in the other circumferential direction relative to the clamp mounting portion 27 during the time from start to end of tightening of the clamp mounting portion 27 by the clamp band 61. These traveling distances (B) and (C) are assumed or regarded as equal to each other. When one circumferential end 103 of the clamp band 61 abuts the stopper 99 (when tightening of the clamp mounting portion 27 is completed), the rotation stopper portion 95 stops at a position before or just before an inner surface of the raised portion 37 of one circumferential end. In order to construct in this mode, a distance or circumferential distance between the inner surfaces of the pair of the raised portions 37, 39 is designed larger than the sum of a width of the rotation stopper portion 95 and the travelling distance (B). Meanwhile, the travelling distance (B) may be set a half of the value given by a following formula;

Circumferential distance or flattened length of the clamp band 61 from a center position (refer to reference numeral 105 in FIG. 7A) of the band-carrier clamp 67 to the stopper 99—(entire flattened length of clamp band 61—length of an outer periphery of the clamp mounting portion 27 before tightened—circumferential length or flattened length of the clamp band 61 from the other circumferential end to the center position 105 of the band-carrier clamp 67)

Figure 6:
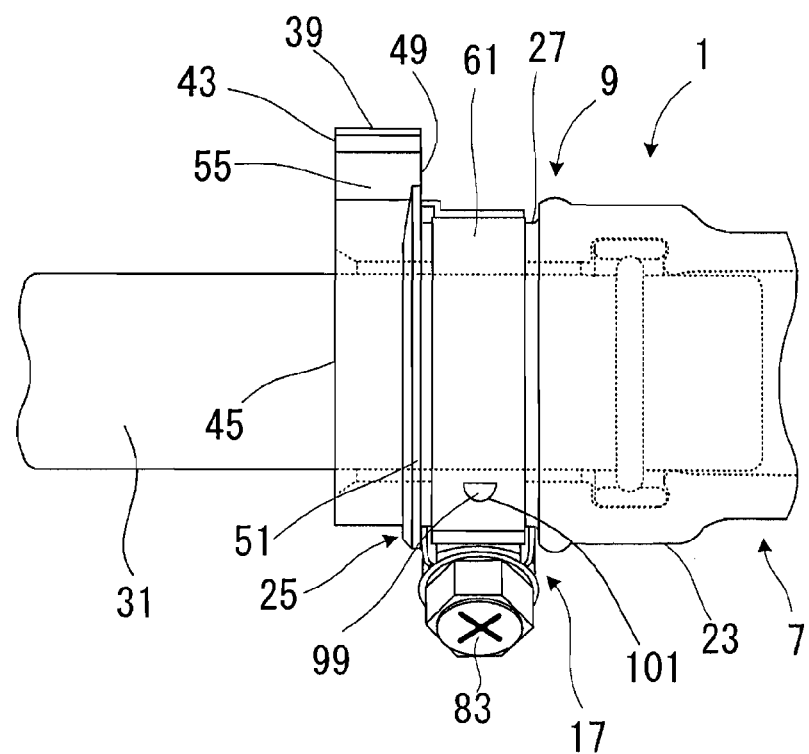
FIG. 6 is a front view showing a state of the corrugated rubber hose equipped with the hose clamp before the hose clamp is tightened

Meanwhile, FIG. 6 is a side view of the corrugated rubber hose 1 in its state, for example, shown in FIG. 7A.

The stopper 99 may be replaced with a marking such as a colored spot, a dent or a bump that is provided or formed on or in the clamp band 61, at the same position as the stopper 99. And, the clamp band 61 may be constructed or operated so as to be diametrically contracted until one circumferential end 103 thereof reaches a position of the marking.

The hose clamp holding structure according to the present invention, enables to effectively connect a hose to a pipe in an area such as around a fuel tank.

What is claimed is:

1. A hose clamp holding structure, comprising:
    a pair of raised portions projecting radially outward and spaced apart circumferentially on an outer periphery of an outer end portion of an end portion of a hose,
    an annular positioning projection on the outer periphery of the outer end portion of the end portion of the hose, the annular positioning projection extending from an outer surface of one of the raised portions to an outer surface of the other of the raised portions,
    a portion of an outer periphery of the end portion of the hose, lying longitudinally inward of the annular positioning projection, and
    a hose clamp having an annular clamp body and an anti-rotation engaging portion on the annular clamp body, the hose clamp being attached on the outer periphery of the end portion of the hose by fitting the clamp body on an annular clamp mounting portion between the annular positioning projection and the large diameter portion with the anti-rotation engaging portion received non-rotationally in a recessed engaging portion between the pair of the raised portions, the portion of the outer periphery of the end portion of the hose having a diameter larger than the annular clamp mounting portion, wherein the annular positioning projection has a body portion extending in a circular arc from a base end portion of the outer surface of the one of the raised portions to a base end portion of the outer surface of the other of the raised portions, one end portion provided integrally on one circumferential end of the body portion and connected to the outer surface of the one of the raised portions, and the other end portion provided integrally on the other circumferential end of the body portion and connected to the outer surface of the other of the raised portions, wherein an outer surface of the one end portion of the annular positioning projection extends in a tangential direction or generally in a tangential direction with respect to one circumferential end of an outer surface of the body portion, and an outer surface of the other end portion of the annular positioning projection extends in a tangential direction or generally in a tangential direction with respect to the other circumferential end of the outer surface of the body portion and, wherein longitudinally extending outer surfaces of the pair of the raised portions are flush with an outer end surface of the outer end portion of the end portion of the hose.

2. The hose clamp holding structure as set forth in claim 1, wherein longitudinally extending inner surfaces of the pair of the raised portions are flush with a longitudinally extending inner surface of the annular positioning projection.

3. The hose clamp holding structure as set forth in claim 1, wherein an inner surface of the raised portion against which the anti-rotating engaging portion is pressed is formed so as to open in the direction toward the annular positioning projection.

4. The hose clamp holding structure as set forth in claim 3, wherein the inner surface of the raised portion opens at an angle of 3 to 5 degrees.

\* \* \* \* \*